Nov. 17, 1942.  E. J. GIBSON ET AL  2,302,206
FISHING PLUG
Filed Oct. 9, 1941
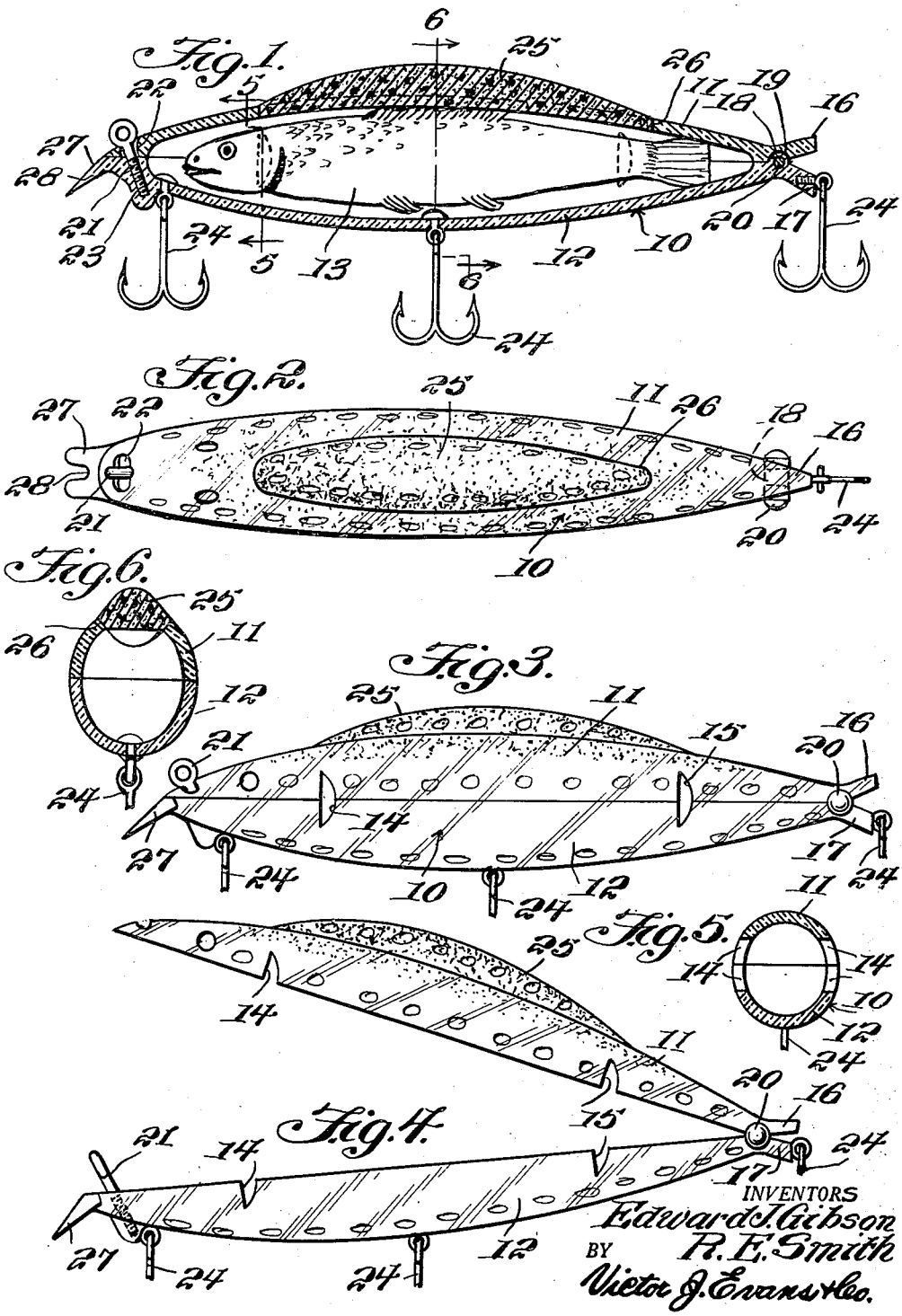
INVENTORS
Edward J. Gibson
R. E. Smith
BY Victor J. Evans & Co.
ATTORNEYS Patented Nov. 17, 1942

2,302,206

UNITED STATES PATENT OFFICE 2,302,206

FISHING PLUG

Edward J. Gibson and Robert E. Smith,
Detroit, Mich.

Application October 9, 1941, Serial No. 414,346

3 Claims. (Cl. 43—41)

This invention relates to a fishing plug and has for an object to provide a plug which may be used to still fish, ice fish, cast, and troll, the plug being so constructed as to house live bait so that the fishermen may fish all day long with the same live minnow on the inside of the plug.

A further object is to provide a plug formed of two sections hinged together at the rear end and locked together at the front end by a removable screw, the sections having diverging portions at the rear end providing means by which the sections may be readily opened when a minnow is to be placed in or removed from the plug.

A further object is to provide a device of this character which will be formed of a few simple strong and durable parts, which will be inexpensive to manufacture, and will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming part of this specification,

Figure 1 is a longitudinal sectional view of a fishing plug constructed in accordance with the invention.

Figure 2 is a top plan of the plug.

Figure 3 is a side elevation of the plug.

Figure 4 is a side elevation of the plug with the sections open.

Figure 5 is a cross sectional view of the plug taken on the line 5—5 of Figure 1.

Figure 6 is a cross sectional view of the plug taken on the line 6—6 fo Figure 1.

Referring now to the drawing in which like characters of reference designate similar parts in the various views, the fishing plug comprises a body 10 similar in appearance to a minnow and comprising upper and lower sections 11 and 12 formed preferably of transparent plastic material. The upper section is inverted U shape in cross section, see Figure 6, and the lower section is U shape in cross section so that the sections form a hollow body or housing for live bait such as a minnow 13. Both sections are provided in the sides with vertically disposed inlet and outlet openings 14 and 15 through which water may enter and leave the body to preserve the minnow alive throughout a day of fishing.

Projections 16 and 17 extend in rearwardly divergent relation from the rear end of the plug sections. These projections simulate the tail of a minnow, and provide means by which the sections may be readily opened on a hinge 18 when a minnow is to be placed in or removed from the plug. The hinge comprises interfitting eyes 19 carried by the projections, and a pivot pin 20 passed through the eyes.

A lock is carried at the front end of the sections and comprises an eye screw 21 which is engaged through an opening 22 in the upper section 11 and is threadedly engaged in an opening 23 formed in the lower section. The eye of the eye screw receives the end of the fishing line in the usual manner. Unscrewing of the eye screw permits the sections to be rocked from the closed position shown in Figure 1 to the open position shown in Figure 4.

The lower section 11 is equipped with preferably three fish hooks 24 although a greater or a less number may be used. The upper section is equipped with a cork float 25 which is tapered from the center to both ends, as shown in Figures 1 and 2, to promote streamlining of the float. The marginal edge of the float is secured in any preferred manner to the wall of an opening 26 formed in the top section of the plug. The float tends constantly to maintain the plug in normal position with the hooks 24 extending downwardly from the lower section of the plug.

A stationary spoon 27 is fixed to the lower section 12 of the plug, at the front end of the section and is sloped downwardly and forwardly from the section. The spoon is provided centrally of the forward end with a recess 28, see Figure 2. The spoon tends to cause the plug to dive when retrieved, or drawn forwardly through the water.

It will be pointed out that the opening 22 is elongated, see Figure 2, to permit the eye of the eye screy 21 to pass therethrough when the eye screw has been turned from its locking position so that the eye screw will be permanently attached to the lower section, see Figure 4, and cannot become lost.

From the above description it is thought that the construction and operation of the invention will be fully understood without further explanation.

What is claimed is:

1. A fishing plug comprising, a hollow body formed of an upper convex transparent section, a lower concave transparent section, one of the said sections having water inlet and outlet openings, a hinge connecting both sections together at the rear ends, means on the rear ends of the sections through the medium of which the sections may be readily opened to remove or insert a live bait within the sections, a cork float extending longitudinally of the upper side of the upper section, a fish hook carried by the lower section, lock means for detachably connecting together the front ends of the section, and means on the front end of the lower section for causing the plug to dive when retrieved.

2. The structure as of claim 1 and in which the first named means comprises projections extending in rearwardly divergent relation from the rear ends of the sections in rear of the hinge and adapted to be moved toward each other by the operator's fingers to swing open these sections on the hinge.

3. The structure as of claim 1 and in which said lock means comprises an eye screw engaged through an elongated opening in the front end of the upper section threadedly engaged in an opening in the front end of the lower section, the eye screw being rotatable to dispose the eye of the screw longitudinally of said opening to permit the eye passing through the opening when the sections are rocked open on the hinge.

EDWARD J. GIBSON.
ROBERT E. SMITH.